March 8, 1927.
F. K. MURPHY ET AL
1,620,121
FLUID OPERABLE LUBRICATOR FOR ENGINES
Filed Oct. 30, 1923
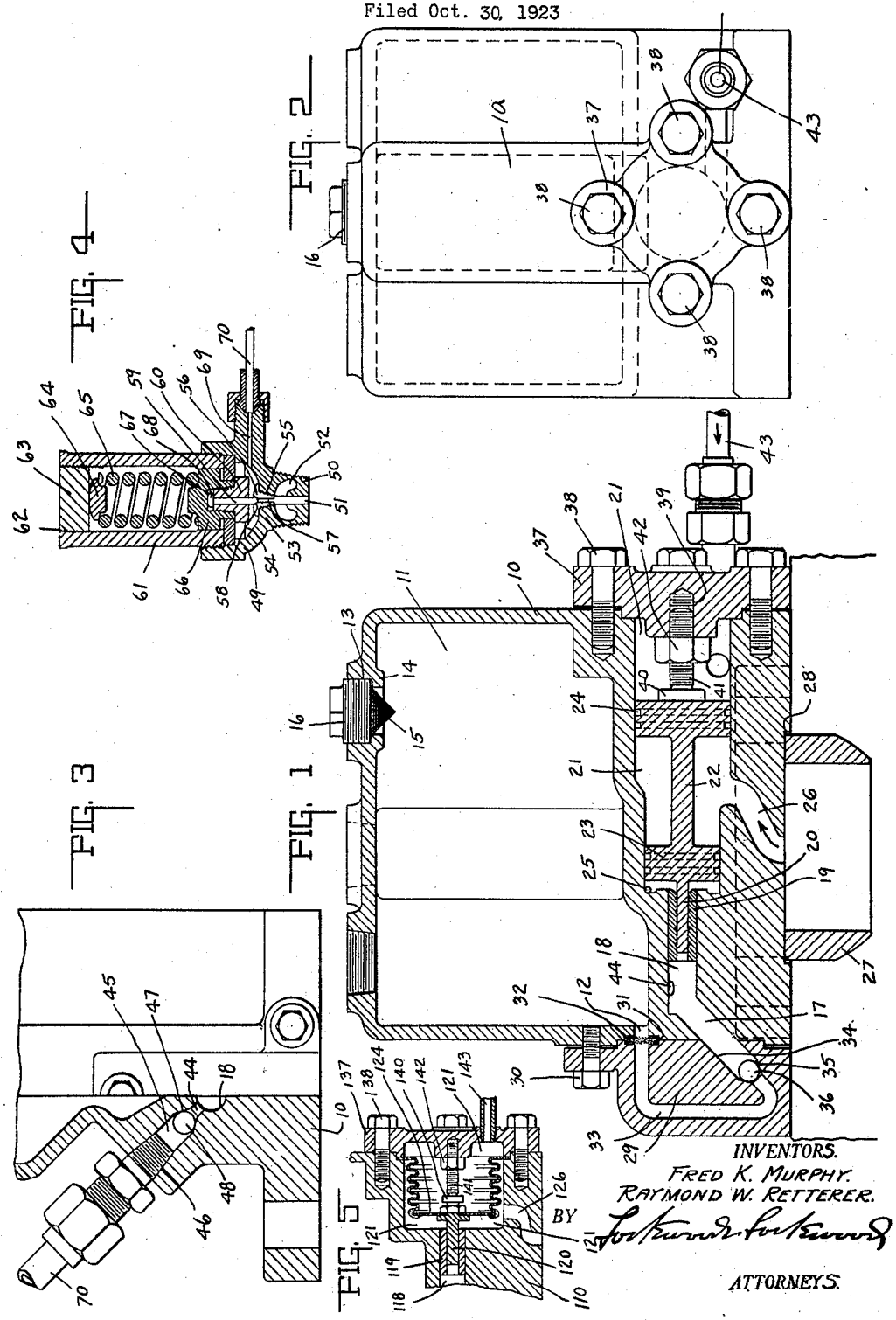
INVENTORS.
FRED K. MURPHY.
RAYMOND W. RETTERER.
BY
ATTORNEYS.

Patented Mar. 8, 1927.

1,620,121

UNITED STATES PATENT OFFICE.

FRED K. MURPHY AND RAYMOND W. RETTERER, OF INDIANAPOLIS, INDIANA.

FLUID-OPERABLE LUBRICATOR FOR ENGINES.

Application filed October 30, 1923. Serial No. 671,689.

This invention relates to a lubricator construction for fluid operable devices such as a locomotive or stationary engine. Said lubricator is of the force feed type of supplying a determined amount of lubricant to the fluid operable device only when the moving parts of said device are in motion.

The chief object of the invention is to construct a lubricator construction of the force feed type which is adapted to be associated with a fluid operable device, such as a stationary steam engine or a locomotive and the like for supplying lubricant to said fluid operable device only when the moving parts of said device are moving.

The full nature of the invention will be understood from the accompanying drawings and the following description and claims:

In the drawings, Fig. 1 is a central sectional view of the lubricator and two of the connections thereto, one being shown in elevation. Fig. 2 is an end elevational view of the same. Fig. 3 is a partial sectional view of a portion of the lubricator with a regulator valve associated therewith shown in elevation. Fig. 4 is an enlarged central sectional view of the regulator valve shown in Fig. 3. Fig. 5 is a reduced central sectional view of a modified form of lubricator, particularly modified in the fluid pressure operable mechanism.

In the drawings 10 indicates a body portion of the lubricator including a lubricant receiving reservoir or chamber 11 having a discharge port 12 near the base thereof and a filling opening 13 near the top thereof. The filling opening is provided with a seat 14 adapted to support a strainer or screen 15 which is maintained in position by the plug closure 16. Positioned beneath the reservoir 11 and within the body portion 10 is a lubricant supply channel 17 which terminates in a chamber 18, said chamber being adapted to receive a cylinder forming sleeve 19 which slidably supports a lubricant pump piston 20. In axial alignment with said chamber 18 is another chamber 21, and positioned in said chamber 21 is a piston having a rod 22 carrying at each end heads 23 and 24. In the chamber 21 adjacent the cylinder forming sleeve 19 is a vent or port leading to the atmosphere, and herein the same is indicated by the numeral 25. This is for relieving the pressure behind the piston head 23 when the piston is moved to the left. A channel 26 communicates with the chamber 21 between the two heads 23 and 24. Associated with the base of the body portion 10 is a joint ring 27 having a fluid-tight joint by being seatable in a faced recess 28 in the base of said body portion.

The rear or back cap plate indicated generally by the numeral 29 is rigidly but detachably secured to the body portion by suitable securing means, such as the bolts 30. Said rear cap provides a seat 31 for supporting a strainer and screen construction 32 interposed between said cap and said body portion adjacent the discharge opening 12. A channel 33 communicates with the discharge opening 12 through said strainer construction, and near the end thereof is enlarged at 34 to communicate with the opening 17 in the body portion leading to the pump chamber of the lubricator. A seat 35 is formed at the junction of the channel 33 and enlarged portion 34 thereof and a ball 36 is seatable thereon and constitutes a check valve for preventing the return of the lubricant to the reservoir after it has been supplied to the pumping chamber 18 by suction and gravity.

The aligned chamber 21 is closed by a front or fore cap 37 suitably but rigidly secured to the body portion 10, as by the bolts 38. Said fore cap has a threaded opening 39 in its inner face and adjustably supports a stud or stop 40 having a threaded stem 41. A suitable lock nut 42 locks the stud or stop supporting threaded portion in the adjusted position. The stroke of the piston thus is determined by the engagement of head 24 with the adjustable stop construction. A pressure supply pipe 43 communicates with the chamber 21 upon the stud or stop engageable side of the piston. From the foregoing, therefore, it will be understood that the positioning of the adjustable stop 40 determines the stroke of the lubricant piston or plunger 20, and, therefore, determines the amount of lubricant handled by the pump at each stroke thereof.

When fluid is supplied to the fluid-operable device for actuating the movable parts thereof upon starting, the fluid flows, in the case of a valve of a locomotive or stationary engine upon starting, through the joint ring 27 and communicating passage 26 to the chamber 21 between the heads 23 and 24.

Pressure in this chamber acting upon the rear face of the head 24 causes said piston to move to the right until said head 24 engages the stop 40, carrying with it the piston 20. This movement to the right of the piston 20 draws sufficient lubricant from the chamber 11 through the ports and channels 12, 33 and 34 past the ball check 36 and into the pumping chamber 18. It is to be understood that there should be a predetermined ratio between the volume displaced by the pump piston and the volume of the chamber 18, so that efficient pumping will be secured.

Thereafter in the case of a locomotive or stationary engine, steam is admitted to one side of the piston through the valve or steam distribution mechanism to move the piston of the locomotive or stationary engine on the return stroke. The pipe 43 of the lubricator is connected to this side of the cylinder containing the piston of the fluid operable device, and thus pressure is supplied simultaneously to that portion of the chamber 21 carrying the enclosing stop 40. Since the pressure exerted to maintain the piston 24 in position at the extreme right and abutting stop 40 is the difference between the areas of the heads 23 and 24 multiplied by the pressure per unit area; and since the intermittently supplied pressure exerted upon the opposite face of the head 24 to force said piston and stem 22 to the left is the product of the area of the head 24 by the pressure in the chamber, which total pressure exceeds the total pressure tending to maintain the construction toward the right, said head 24, stem 22 and plunger 20 will move to the left and force the lubricant drawn into the pump chamber 18 out through the channel 44 in said chamber. Upon this stroke of the piston 20, the ball check valve 36 is seated upon its seat 35 and prevents the return of the lubricant through the channel 33 to the reservoir 11.

Reference will now be had to Figs. 3 and 4. The channel 44 communicating with the lubricant chamber 18 is enlarged at 45 and is likewise threaded as at 46 adjacent the end of said passage. At the enlargement 45, a seat 47 is formed and a ball 48 is seatable thereon. Upon the suction stroke of the lubricating piston 20, the ball check 48 is seated and thus prevents the return of the lubricant discharged into the channel 45 but permits the discharge of lubricant from the channel 33 communicating with the reservoir 11. Upon the return or pressure stroke of the piston 20, the ball check 36 is seated to prevent the return of the lubricant through the supply channel, and the ball 48 is unseated to permit the discharge of the lubricant from the pump chamber 18 into the channel 45.

In Fig. 4 there is illustrated a regulator valve construction having a base 49 provided with a threaded stem 50 seatable in the threaded portion 46 of the channel 45.

From the foregoing it will be noted that the operating fluid, which generally but not always is steam, is supplied to the base of the reservoir 11. Therefore, substantially the entire base of said reservoir is subjected to heat which is transferred by the bottom wall of the reservoir to the lubricant within the same. Thus, the operating fluid is adapted to heat the lubricant and maintain the same in the desired state of fluidity.

The spring regulator valve shown particularly in Fig. 4 is connected to the fluid conveying device, such as the steam pipes of the fluid operable device, such as a locomotive or stationary engine. The spring regulator valve includes the base 49 having a central channel 51 therein which is adapted to communicate with the main channel 45 shown in Fig. 3, controlled by the ball check 48. A chamber 52 freely communicates with said channel 51 (see Fig. 4) and a wall 53 separates the chamber 52 from another chamber 54 formed in said base 49. An apertured threaded opening 55 receives a valve forming seat 56 having a fuel discharge opening 57 therein which communicates with the chamber 52 and also the channel 51. Said channel 57 is enlarged at 58 to form a valve seat controlled by the valve 59 supported in a guide member 60. The body 49 of the valve supports a spring housing 61 by means of a threaded enlargement, and said spring housing contains an open threaded end 62 closed by an adjusting plug 63 adjustably positioned therein. Said plug 63 bears upon a spring retaining cap 64 which forms a seat for one end of the coiled spring 65, the other end of which bears upon a seat 66 limited in its downward movement by the base 49 and is slidably supported by the housing 61. A recess 67 is positioned centrally therein and the wall thereof is engaged by the head 68 of the valve stem 59 slidably supported with the guide member 60. The application of pressure to the channel 51 serves to raise the valve member 60 from its seat and the head 68 moves the member 66 upwardly to compress the spring 65, the tension of which is adjusted as desired by means of the closure 63. Upon the elevation of the valve member 59, lubricant is discharged at the predetermined pressure or at a greater pressure into the chamber 54 from whence it discharges into a lateral channel 69 to suitable conduit means 70 adapted to convey the same at or above the predetermined pressure, determined by the spring regulator valve herein described to the several parts of the fluid operable device requiring lubrication.

In Fig. 5 there is illustrated a modified form of the invention in which the fluid pressure operable means is of the sylphon type instead of the piston plunger type previously described. Parts in Fig. 5 which are similar to parts in Figs. 1 to 3, inclusive, are indicated by similar numerals of the 100 series. The latter adjustably supports the bolt 141 carrying the stop 140, and is rigidly secured in the adjusted position by the nut 142.

The pump chamber 118 communicates with the cylinder or sleeve 119 slidably supporting the pump piston 120 reciprocable therein by the actuating portion 124. Fluid pressure is intermittently admitted to chamber 121 and fluid pressure is constantly supplied to chamber 121 upon the opposite side of the sylphon construction. The first mentioned or intermittent pressure is supplied through line 143 and the second mentioned or constantly applied pressure is supplied through the duct or passage 126. Movement of the pump piston 120 to the right into engagement with the stop 140 is secured when the intermittent pressure is released through the medium of the constant pressure. When the intermittent pressure is applied to the chamber through line 143, the same opposes constant pressure applied to the opposite face and return movement of the plunger is secured. Reciprocation is secured through the pressure applied through 143 and the pressure applied through 126. This is because there is greater area exposed in the right hand chamber portion than in the left hand chamber portion, and therefore the total effective pressure when intermittently applied exceeds the opposing pressure constantly supplied. The operation of this form of the device is substantially the same as that heretofore described and is covered in the claims by appropriate language common to these two forms of the invention.

The invention claimed is:

1. In a fluid pressure operable lubricator, the combination of a common piston rod, a lubricant impelling piston secured thereto, a pair of power pistons also secured to said rod and having different pressure exposable areas, a chamber in which the power pistons are constantly subjected to fluid pressure, and another chamber in which but one of said power pistons is intermittently subjected to pressure whereby reciprocation of the pump piston is secured.

2. A device of the character defined by claim 1 characterized by the power piston exposed to both chambers having the greater area, and subjected intermittently to pressure in the second mentioned chamber.

3. A device of the character defined by claim 1 characterized by means associated with one end of the piston rod for limiting the stroke thereof and therefore the stroke of the lubricant piston thereon.

In witness whereof, we have hereunto affixed our signatures.

FRED K. MURPHY.
RAYMOND W. RETTERER.